United States Patent [19]

Flynn et al.

[11] Patent Number: 4,853,133
[45] Date of Patent: Aug. 1, 1989

[54] COAL DEWATERING

[75] Inventors: Steven A. Flynn, Thames Ditton; Paul R. Rutter, Richmond, both of England

[73] Assignee: The British Petroleum Company p.l.c., London, England

[21] Appl. No.: 132,951

[22] PCT Filed: May 7, 1987

[86] PCT No.: PCT/GB87/00303
§ 371 Date: Dec. 10, 1987
§ 102(e) Date: Dec. 10, 1987

[87] PCT Pub. No.: WO87/06855
PCT Pub. Date: Nov. 19, 1987

[30] Foreign Application Priority Data
May 10, 1986 [GB] United Kingdom ................. 8611462
Dec. 12, 1986 [GB] United Kingdom ................. 8629768

[51] Int. Cl.⁴ ............................................. B01D 21/26
[52] U.S. Cl. ........................................ 210/729; 209/4; 209/5; 210/752; 210/787

[58] Field of Search ............... 209/4, 5; 210/710, 725, 210/727, 728, 729, 787, 752

[56] References Cited

U.S. PATENT DOCUMENTS

| | | | |
|---|---|---|---|
| 3,165,465 | 1/1965 | Ray et al. | 209/5 |
| 3,408,293 | 10/1968 | Dajani | 209/5 |
| 3,801,475 | 4/1974 | Taylor | 203/20 |
| 3,929,633 | 12/1975 | Visman et al. | 210/209 |
| 4,210,531 | 7/1980 | Wang et al. | 210/727 |
| 4,290,897 | 9/1981 | Swihart | 210/710 |
| 4,529,506 | 7/1985 | Smit | 209/13 |

FOREIGN PATENT DOCUMENTS 516444 4/1980 Australia.
3022831 1/1982 Fed. Rep. of Germany.

Primary Examiner—Peter Hruskoci
Attorney, Agent, or Firm—Morgan & Finnegan

[57] ABSTRACT

The water content of wet small coal is reduced by adding a defined amount of an ionic surfactant, centrifuging, and adding a foam suppressing amount of a cationic organic compound to the aqueous effluent from the centrifugation step.

8 Claims, 2 Drawing Sheets

COAL DEWATERING

The present invention relates to the de-watering of small coal.

Small coal is coal in the size range 38 to 0.5 mm. Many coal mines produce a considerable quantity of coal in this size range which is washed in water to remove mineral matter. It is then necessary to recover the small coal from the water. This is done, for example, by using centrifuges. However, the product from the centrifuging step still contains significant quantities of water. It would be desirable to find a method of decreasing the water content of the de-watered product still further. However, the cost of obtaining any additional water removal must be considerably less than the cost of installing and operating the water removal system.

Various specific mixtures of surfactants and kerosine have been proposed as coal de-watering agents. We have found however that either the improvement obtained by the use of these proprietary materials is not sufficient to justify the expense of using them of they lead to subsequent processing problems.

According to the present invention the process for reducing the water content of wet small coal comprises the successive steps of:

(1) adding to the small coal, a quantity of a water soluble anionic surfactant in the range 25 to 200 ppm based on weight of water in the wet small coal, (2) subjecting the coal to a centrifugation step, and (3) subsequently adding a foam-suppressing amount of a cationic organic compound to the aqueous effluent from the centrifugation step.

The process of the present invention may be applied to coal in the size range 38 mm to 0.5 mm, for example coal in the size range 13 to 0.5 mm.

At the concentration of anionic surfactant used in the process of the invention an economically useful reduction of moisture content can be obtained without requiring the use of an excessive amount of cationic organic compound to suppress the foam.

The water content of coal before it is subjected to the process of the present invention may for example be in the range 9 to 17% by weight.

The anionic surfactant may be for example a dialkylsulphosuccinate, an alkyl sulphate, an alkyl aryl sulphonate, or an alkyl ether sulphonate.

An example of a dialkyl sulphosuccinate which may be used is one in which the alkyl groups contain from 5 to 12 carbon atoms in the alkyl group. A particular example which may be used is dioctylsulphosuccinate.

The alkyl aryl sulphonate may be a sulphonate in which the aryl group is a benzene group or a napthalene group, and is preferably a dialkyl sulphosuccinate. The alkyl group may contain from 3 to 12 carbon atoms in the alkyl group.

The alkyl sulphate may contain for example from 8 to 15 carbon atoms in the alkyl group. It is preferred to use alkyl sulphates containing 12 carbon atoms in the alkyl group (lauryl sulphate).

The alkyl ether sulphates preferably have from 8 to 15 carbon atoms in the alkyl group, and from one to 10 alkoxy groups, preferably ethoxy groups.

It is particularly preferred to use the alkyl sulphosuccinates and the alkyl ether sulphates. The alkyl ether sulphates have the advantages of being available at lower cost.

The cation associated with the anionic surfactant may for example be sodium or potassium, but sodium is usually preferred on the ground of costs.

Surfactants are commercially available at various concentrations in solvents. When reference is made to a quantity of surfactant in this specification this should be understood as referring to the amount of active ingredient in the commercial preparation, unless the contrary clearly appears from the context.

The quantity of anionic surfactant added to the small coal is in the range 25 to 200 ppm (based on weight water in the wet coal fed to the process). It is preferred to use quantities in the range 50 to 100 ppm. In commercial scale and preparation plants it is particularly preferred to use quantities in the range 70 to 24 ppm based on the weight of water in the wet small coal fed to the dewatering process or 8 to 24 ppm based on the weight of coal.

The addition of anionic surfactant is preferably carried out in the absence of hydrocarbon oil.

The anionic surfactant may be added to the wet coal in the form of an aqueous solution, for example by spraying so as to distribute the surfactant uniformly throughout the wet coal. Wet small coal is often the product of a small coal rinsing step in which the coal is rinsed with water on a rinsing screen to remove magnetite used in dense phase separation processes.

Examples of cationic organic compounds for use in the present invention are quaternary ammonium salts for example quanternary ammonium salts containing at least one higher alkyl chain, e.g. 10 to 25 carbon atoms linked either directly to the nitrogen atom or to an aryl group e.g. a benzene group linked directly to the nitrogen atom. The compound may contain only one quaternary group or may contain two or more quaternary groups. Cationic polyacrylamide flocculants may also be used.

The cationic compound is preferably a cationic compound which does not produce foam when agitated with water. The use of a non-foaming cationic compound has the advantage that any accidental addition of excess cationic compound does not produce an undesirable quantity of foam. The use of a non-foaming cationic compound makes it possible to use an excess of the cationic compound to compensate for any possible variation in the amount of anionic surfactant added to the coal, without running the risk of filling the coal treatment plant with foam generated by the cationic compound.

The cationic compound may be added in a quantity in the range 5 to 200 ppm, preferably 5 to 100 ppm based on weight of aqueous effluent. Thus the quantity of cationic organic compound may be in the range 5 to 35 ppm (based on the weight of effluent). When calculating the amount of cationic compound based on weight of coal examples of values which can be used are those in the range 0.4 to 3 ppm.

BRIEF DESCRIPTION OF THE DRAWING

A specific embodiment of apparatus for use in the process of the present invention will now be described with reference to the drawings where.

Figure 1:
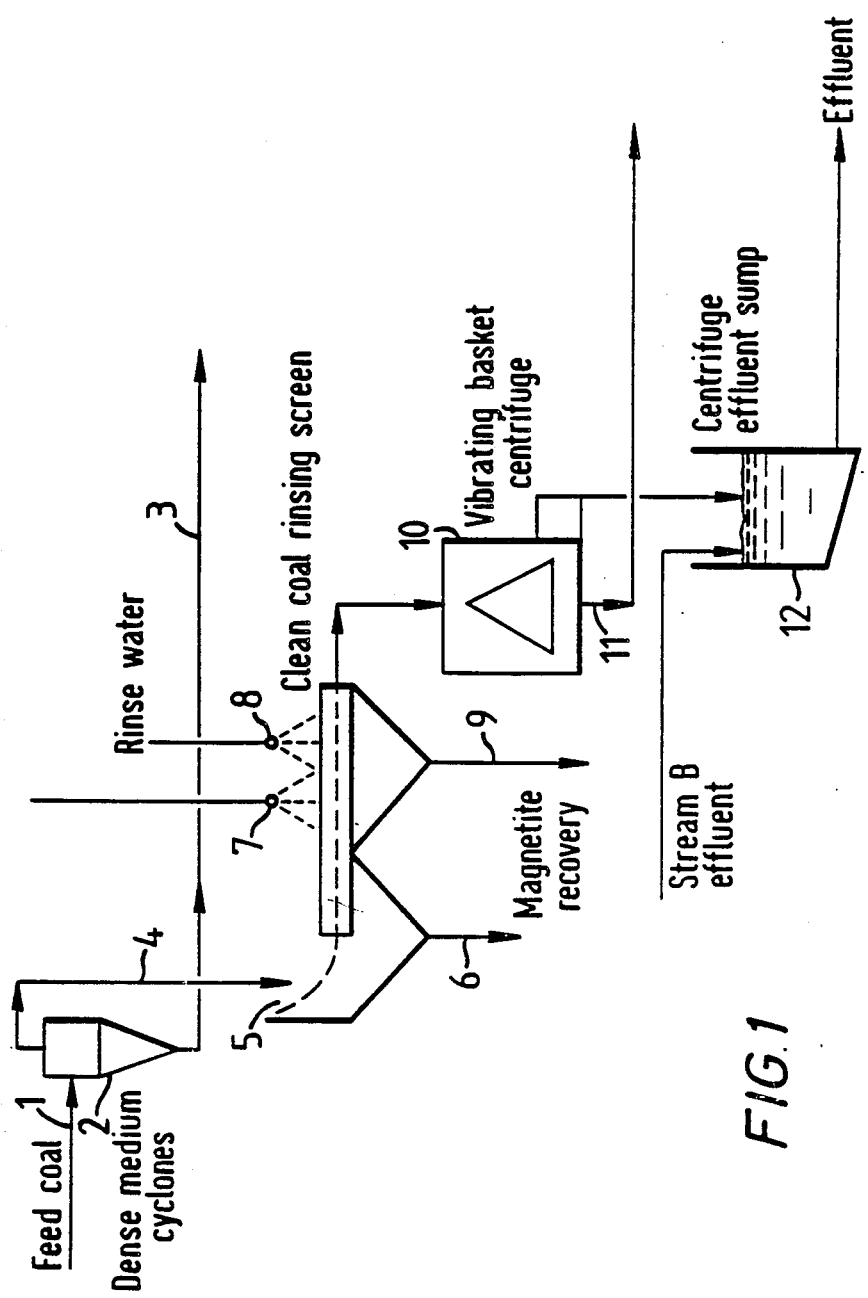
FIG. 1 is a general diagrammatic representation of coal dewatering apparatus for small coal.

Small coal having a size in the range 13 mm to 0.5 mm was fed as an aqueous slurry to a conventional dense medium separation step through line 1 into cyclone separator 2. A bottom stream containing the mineral matter was removed from the base of the cyclone 2 to line 3. The top stream containing the coal with reduced mineral matter content was removed through line 4 and fed to a screen 5 from which the bulk of the magnetite was recovered at 6. The coal was rinsed with water by spray bars 7 and 8 and additional magentite was removed at 9. The rinsed coal then passed from the end of the screen to the centrifuge 10 for dewatering. Coal was removed from the centrifuge at 11. Aqueous effluent from the centrifuge was passed to sump 12.

The apparatus as described above corresponds to a conventional. coal preparation plant. It was modified for carrying out surfactant addition by providing a spray bar 14 at the end of screen 5 after the rinsing sprays 7 and 8. The spray bar 14 was supplied with water through line 15. Surfactant could be introduced into this line from drum 16 by a variable flow plunger type meter pump 17. An elbow-type injection mixer 18 was used to ensure efficient dispersion of the surfactant in the water. The mixer was located between two valves 19 and 20. A pressure gauge is indicated by PG.

Another coal separation and dewatering step with a centrifuge was also used but no surfactant was added to this stream. The effluent from the centrifuge in a second coal treatment stream was fed to the common sump 12.

An experiment was carried out using as surfactant a sodium dioctyl sulphosuccinate supplied in the form of drums containing liquid surfactant with a content of active ingredient of 75% by weight.

COMPARATIVE TEST A

Coal from a single mine ws processed in a coal beneficiation plant as shown in FIG. 1. The material passing through this plant is identified as Stream A. No surfactant was added. The product was sampled and the total moisture content was determined at intervals by drying in a forced air oven at 105° C. to constant weight.

The results are given in Table 1 under the heading "control moisture".

COMPARATIVE TEST B

Figure 2:
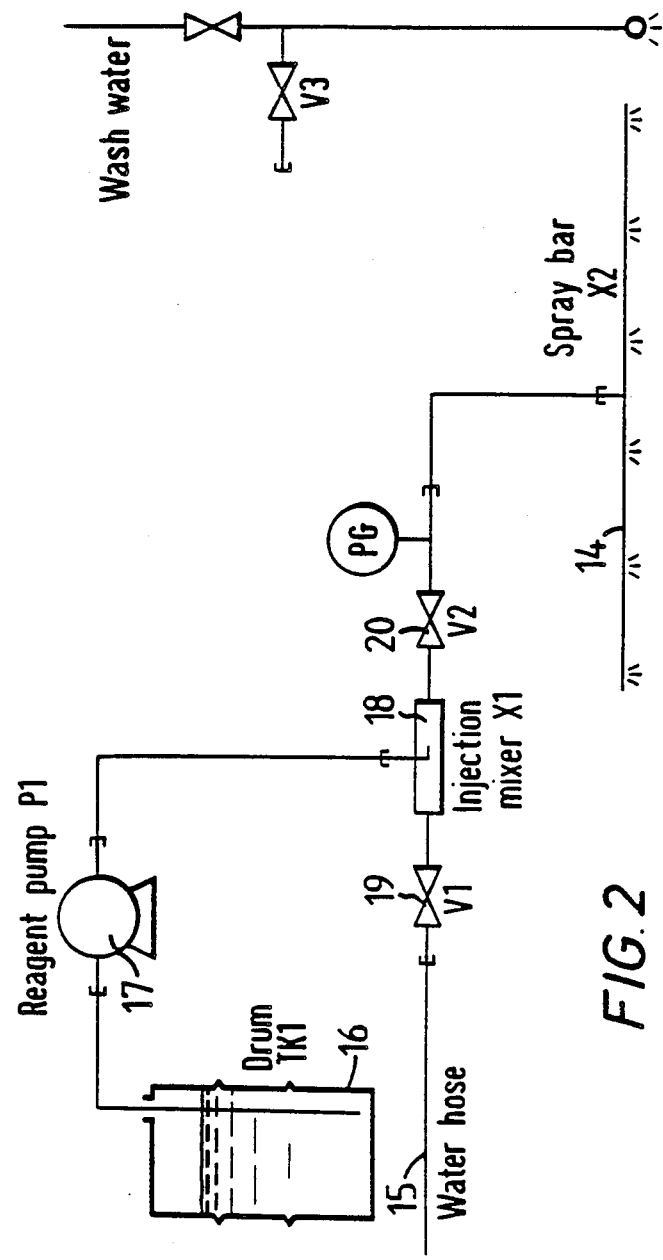
FIG. 2 is a diagrammatic representation of an arrangement for adding sulphosuccinate surfactant to the small coal being dewatered in the apparatus of FIG. 1.

An experiment was carried out simultaneously with Experiment A using duplicate apparatus with the modifications indicated on FIG. 2. The material passing through this plant is identified as Stream B. Measurements were taken before the experiment to ensure that the product moistures for the streams were comparable. The results in Table 1 indicate that this was the case.

EXAMPLE 1

Sodium dialkyl sulphosuccinate in the form of a commercially available product containing 75% by weight of the surfactant was added through the spray equipment shown in FIG. 2. The results are shown in Table 1 under the heading "product moisture".

TABLE 1

| Ex. | Time from start of test (hrs) | Reagent | Dosage ml/t | Stream B Active dosage * ppm | Active conc. *** ppm | Product Moisture | Stream A Contro Moisture | Difference |
|---|---|---|---|---|---|---|---|---|
| A,B Day 1 | 0 | None | — | 0 | 0 | 7.87 | 7.73 | |
| | ½ | " | — | 0 | 0 | 7.46 | N/D | |
| | 1 | " | — | 0 | 0 | 7.04 | 6.98 | |
| | 15 | " | — | 0 | 0 | 6.73 | 6.74 | |
| 1,B Day 2 | 17 | sulpho-succinate | 16 | 13 | 82 | 6.09 | 7.27 | 1.18 |
| | 19 | " | 16 | 13 | 82 | 6.24 | 7.46 | 1.22 |
| | 21 | " | 16 | 13 | 82 | 6.77 | 7.49 | 0.72 |

* based on coal
** based on liquid in feed coal

The "reagent dosage" is given as ml/tonne of coal. The reagent dosage corresponds to the quantity of surfactant and diluent used. The concentration of sodium dialkyl sulphosuccinate in the "reagent" was 75% by weight.

TABLE 2

| Ex | Time | Module/ stream | Reagent dose ml/t | Active dosage* ppm | Active conc.** | Control Moisture | Product Moisture | Change |
|---|---|---|---|---|---|---|---|---|
| B | 10.00 | | 0 | 0 | 0 | 7.85 | — | — |
| | 12.10 | | 16 | 13 | 82 | | 6.62 | 1.23 |
| 2 | 12.35 | 2/B | 10 | 8 | 52 | | 7.01 | 0.84 |
| | 13.00 | | 10 | 8 | 52 | | 7.09 | 0.76 |
| | 13.30 | | 10 | 8 | 52 | | 7.42 | 0.43 |
| | 14.00 | | 10 | 8 | 52 | | 7.29 | 0.56 |
| C | 9.00 | | 0 | 0 | 0 | 8.25 | — | — |
| | 10.00 | 2/B | 16 | 13 | 82 | | 7.8 | 1.4 |
| | 11.00 | | 0 | 0 | 0 | 9.2 | — | — |
| | 11.30 | | 35 | 29 | 183 | | 7.93 | 1.27 |
| | 12.00 | | 35 | 29 | 183 | | 8.16 | 1.04 |
| | 12.30 | | 35 | 29 | 183 | | 8.33 | 0.87 |

*based on coal
**based on liquid in feed coal

EXAMPLES 2 AND 3

An experiment was carried out as in Example 1 and the results are given in Table 2 under the heading "product moisture".

COMPARATIVE TEST B AND C

An experiment was carried out immediately before and after Examples 2 and 3 using the same and processing streams without surfactant addition. The results are given in Table 2 under the heading control moisture.

EXAMPLES 4 AND 5

The experiments were carried out as in Example 2 but with the surfactant addition equipment attached to a different coal beneficiation apparatus nominally identical to that used in Example 2. The results are in Table 3 under the heading "product moisture".

COMPARATIVE TESTS D AND E

Examples 4 and 5 were preceded by experiments in which no surfactant was added. The results are given in Table 3 under the heading "control moisture".

COMPARATIVE TEST H

An experiment was carried out as in Comparative Tests F and G using an inorganic salt (aluminium chloride). The results are given in Table 4.

EXAMPLES 6-10

An experiment was carried out as in Comparative Tests F and G using dimethyl benzyl coco ammonium chloride (Arquad B-50) (Example 6), trimethyl coco ammonium chloride (Arquad C-33-W) (Example 7), trimethyl dodecyl benzyl ammonium chloride (Resistone QD) (Example 8), a polyquaternary ammonium chloride (Glokill PQ) (Example 9), and a cationic polyacrylamide flocculant (Magnofloc 1597) (Example 10). The results are given in Table 4. ("Pluriol", "Arquad", "Resistone", "Glokill" and "Magnofloc" are trade marks).

EXAMPLES 11-14

Small coal was prescreened to between 4 mm and 0.5 mm and 50 g was mixed with 100 g of water for 2 minutes. A commercially available dioctylsulphosuccinate

TABLE 3

| Ex. | Time hours | Module/ Stream | Reagent ml/t | Active dosage ppm | Active conc. ppm | Control Moisture | Product Moisture | Change % |
|---|---|---|---|---|---|---|---|---|
| D | 0 | 3/A | 0 | 0 | 0 | 8.67 | — | — |
|   | 1 |   | 11 | 9 | 57 |   | 8.31 | 0.36 |
|   | 1½ |   | 11 | 9 | 57 |   | 7.73 | 0.94 |
| 4 | 2 |   | 11 | 9 | 57 |   | 8.10 | 0.57 |
|   | 2½ |   | 16 | 13 | 82 |   | 8.55 | 1.12 |
|   | 3 |   | 16 | 13 | 82 |   | 7.96 | 0.71 |
|   | 3½ |   | 16 | 13 | 82 |   | 8.14 | 0.51 |
| E | 4½ | 2/B | 0 | 0 | 0 | 9.0 | — | — |
|   | 5½ |   | 16 | 13 | 82 |   | 7.44 | 1.56 |
| 5 | 6 |   | 16 | 13 | 82 |   | 7.50 | 1.50 |
|   | 6½ |   | 16 | 13 | 82 |   | 7.79 | 1.21 |

The experiments described above were carried out with surfactant being fed only to one of two coal treatment streams. As a result the surfactant concentration in the sump was only half of the concentration which would be expected if surfactant is added to both streams. When the amount of surfactant fed was increased to correspond to the level which would be present when adding surfactant to both streams a foam layer quickly reached the top of the sump and did not disperse for several hours.

COMPARATIVE TESTS F AND G

Experiments were carried out to test two commercial antifoam additives, namely, Pluriol PE 9200 (a nonionic block polymer) (Comparative Test F) and a commercially available silicone anti-foam in the form of an emulsion (Comparative Test G). The results are given in Table 4.

The test comprised adding antifoam solution (containing 0.1% wt of as received antifoam) to a simulated effluent containing 44 g/l of fine suspended solids and a residual sodium dioctyl sulphosuccinate concentration of 10.5 g/m$^3$ (allowing for adsorption by the solids). The agitated suspension was then aerated. The foam stability was characterised by stopping the air supply and noting the time taken for the foam to collapse from its full extent to the point at which the liquid surface became visible.

salt was mixed with the coal/water mixture for 15 seconds at a stirrer speed of 750 rpm.

The resulting mixture was then introduced into a centrifuge having a screen size of 150 micrometres. The centrifuge was operated for 2 minutes at 700 rpm to give a filter cake of approximately 50 mm thickness. The moisture content of the filtered coal was then determined as in Comparative Test A.

The results are shown in Table 5.

COMPARATIVE TEST I

This is a Comparative Test not according to the invention. An experiment was carried out as in Example 11 except that no surfactant was added to the coal water mixture. The results are shown in Table 5.

EXAMPLES 15-22

Experiments were carried out as in Examples 11-14 but using different commercially available dioctylsulpho succinate surfactants. Examples 15-18 used an alkylsulphosuccinate commercially available from the firm of Tensia under the designation D8/75. Examples 19-22 were carried out using another commercially available dioctylsulphosuccinate.

COMPARATIVE TEST L AND EXAMPLES 23-26

Experiments were carried out as in Comparative Test I and Examples 11-14 but using a different anionic surfactant, namely tetrasodium N-(1,2-dicarboxy-ethyl)-N-octadecyl sulphosuccinate, sold under the designation "Aerosol 22N" by the firm of Cyanamid. The commercially available product had a concentration of active ingredient of 35% wt/wt. The results are given in Table 6.

COMPARATIVE TEST M AND EXAMPLES 27–30

Experiments were carried out as in Comparative Test I and Examples 11–14 but using as anionic surfactant a sodium diisopropyl naphthalene sulphonate, commercially available from the firm of Cyanamid and containing 75% by weight approximately of active ingredient.
The results are shown on Table 6.

COMPARATIVE TEST N AND EXAMPLES 31–34

Experiments were carried out as in Comparative Test I and Experiments 11–14 but using as surfactant sodium lauryl sulphate obtained from the firm of BDH Limited.
The results are shown in Table 6.

COMPARATIVE TEST O AND EXAMPLES 35–38

Experiments were carried out as in Comparative Test I and Examples 11–14 except that the surfactant used was a sodium lauryl ether sulphate commercially available from BP Detergents in the form of a mixture containing 70% of active material. The results are given in Table 7.

COMPARATIVE TEST P AND EXAMPLES 39–42

Experiments were carried out as in Test 0 and Examples 35–38 except that the sodium lauryl ether sulphate was in the form of a commercially available product from BP Detergents containing 27% by weight of active material. The results are given in Table 7.

TABLE 4

| | Comparison of Antifoam Activity* | | | |
|---|---|---|---|---|
| | Foam destruction | | Foam control** | |
| Experiment | Min conc. ppm | Max conc. ppm | Min conc. ppm | Max conc. ppm |
| F | Not effective | | Not effective | |
| G | 167 | — | 113 | — |
| H | 300 | — | 267 | — |
| 6 | 20 | 100 | 10 | 100 |
| 7 | 40 | 50 | 33 | 50 |
| 8 | 33 | 40 | 7 | 50 |
| 9 | 33 | — | 7 | — |
| 10 | — | — | 20 | 40 |

*Measured by estimating foam collapse time for standard conditions
**Foam collapse time less than 10 seconds.

TABLE 5

| * Active concentration ppm | ** Amount of surfactant g/tonne (active) | Test I and Examples 11–14 Surface Tension mN/m | % wt H$_2$O | Test I and Example 15–18 Surface Tension mN/m | % wt H$_2$O | Test I and Example 19–22 Surface Tension mN/m | % wt H$_2$O | % PTS H$_2$O Reduction I and 11–14 | I and 15–18 | I and 19–22 |
|---|---|---|---|---|---|---|---|---|---|---|
| 0 | 0 | approx. 65 | 10.7 ± 0.3 | approx. 65 | 10.7 ± 0.3 | approx. 65 | 10.7 ± 0.3 | nil | nil | nil |
| 25 | 50 | 40.5 | 9.0 ± 0.3 | 41.6 | 9.7 | 42.5 | 9.6 | 1.7 | 1.0 | 1.1 |
| 50 | 100 | 34.6 | 8.9 ± 0.2 | 35.8 | 8.7 | 35.9 | 9.1 | 1.8 | 2.0 | 1.6 |
| 100 | 200 | 29.2 | 8.5 ± 0.2 | 30.2 | 8.9 | 30.9 | 9.3 | 2.2 | 1.8 | 1.4 |
| 200 | 400 | 26.6 | 8.2 ± 0.2 | 27.7 | 8.1 | 26.7 | 8.2 | 2.5 | 2.6 | 2.5 |

* based on water
** based on solid

TABLE 6

| * Active concn. ppm | ** Amount of surfactant g/tonne (active) | Test L and Examples 23–26 Surface Tension mN/m | % wt H$_2$O | Test M and Example 15 27–30 Surface Tension mN/m | % wt H$_2$O | Test N and Example 19–22 31–34 Surface Tension mN/m | % wt H$_2$O | % PTS H$_2$O Reduction L and 23–26 | M and 27–30 | N and 31–34 |
|---|---|---|---|---|---|---|---|---|---|---|
| 0 | 0 | approx. 66 | 10.4 ± 0.6 | approx. 68 | 10.4 ± 0.6 | approx. 68 | 10.4 ± 0.6 | nil | nil | nil |
| 25 | 50 | 54.8 | 10.1 ± 0.2 | 58.6 | 10.0 ± 0.1 | 58.6 | 10.0 ± 0.1 | 0.3 | 0.4 | ±0.7 |
| 50 | 100 | 52.3 | 9.6 ± 0.2 | 55.3 | 9.7 ± 0.2 | 55.3 | 9.7 ± 0.2 | 0.8 | 0.7 | 0.5 |
| 100 | 200 | 48.7 | 8.1 ± 0.2 | 53.4 | 8.6 ± 0.2 | 53.4 | 8.6 ± 0.2 | 2.3 | 1.8 | 1.6 |
| 200 | 400 | 47.7 | 8.3 ± 0.2 | 48.3 | 8.3 ± 0.2 | 48.3 | 8.3 ± 0.1 | 2.1 | 2.1 | 2.2 |

* based on water
** based on solid

TABLE 7

| * Active Concentration ppm | ** Amount of surfactant g/tonne (active) | Test O and Examples 35–38 Surface Tension mN/m | % wt H$_2$O | Test P and Examples 39–42 Surface Tension mN/m | % wt H$_2$O | % PTS H$_2$O Reduction Test O and Ex 35–38 | Test P and Ex 39–42 |
|---|---|---|---|---|---|---|---|
| 0 | 0 | approx. 67 | 10.1 ± 0.3 | approx. 67 | 10.1 ± 0.3 | nil | nil |
| 25 | 50 | approx. 44 | 8.5 ± 1.3 | approx. 44 | 8.5 ± 1.3 | 1.6 | 1.0 |
| 50 | 100 | approx. 33 | 7.9 ± 0.3 | approx. 36 | 7.9 ± 0.3 | 2.2 | 2.2 |
| 100 | 200 | approx. 33 | 7.5 ± 0.0 | approx. 34 | 7.5 ± 0.0 | 2.6 | 2.6 |
| 200 | 400 | approx. 33 | 7.5 ± 0.0 | approx. 29 | 7.5 ± 0.0 | 2.6 | 2.6 |

* based on water
** based on solid

We claim:
1. The process for reducing the water content of wet small coal in the size range 38 mm to 0.5 mm which comprises the successive steps of:
   (1) adding to the small coal a quantity of water soluble anionic surfactant in the range 25 to 200 ppm based on weight of water in the wet small coal, wherein said anionic surfactant is selected from the group consisting of a dialkyl sulphosuccinate in which each alkyl group contains from 5 to 12 carbon atoms, an alkyl aryl sulphonate in which the aryl group is a benzene group or a napthalene group and the alkyl group contains from 3 to 12 carbon atoms, an alkyl sulfate in which the alkyl group contains from 8 to 15 carbon atoms, and an alkyl ether sulfate in which the alkyl group contains from 8 to 15 carbon atoms, (2) subjecting the coal to a centrifugation step to produce coal with reduced water content and an aqueous effluent, and (3) subsequently adding a foam-suppressing amount of a cationic organic compound to the aqueous effluent from the centrifugation step, said cationic organic compound being a quaternary ammonium salt having at least an alkyl chain having from 10 to 25 carbon atoms linked directly to the nitrogen atom or to an aryl group linked directly to the nitrogen atom.

2. A process according to claim 1 wherein the anionic surfactant is an alkyl ether sulphate.

3. A process according to claim 2 wherein the surfactant is a lauryl ether sulphate.

4. A process according to claim 1 wherein the surfactant is a dialkyl sulphosuccinate.

5. A process according to claim 4 wherein the sulpho succinate is sodium dioctyl sulpho succinate.

6. A porocess according to any one of claims 1, 2 or 4 wherein the quantity of anionic surfactant is in the range 50 to 100 ppm.

7. A process according to claim 1 wherein the quantity of aniomic surfactant is in the range 8–24 ppm based on weight of coal.

8. A process according to claim 1 wherein the quantity of cationic organic compound additive is in the range 5 to 200 ppm based on weight of aqueous effluent from the centrifugation step.

* * * * *